US00RE46259E

(19) United States
(12) Reissued Patent
Kim

(10) Patent Number: US RE46,259 E
(45) Date of Reissued Patent: Jan. 3, 2017

(54) MOBILE PHONE MONITOR

(71) Applicant: Samsung Electronics Co., Ltd., Suwon-si (KR)

(72) Inventor: Dong-Kyun Kim, Seoul (KR)

(73) Assignee: Samsung Electronics Co., Ltd., Suwon-si (KR)

(21) Appl. No.: 29/487,578

(22) Filed: Apr. 10, 2014

Related U.S. Patent Documents

Reissue of:
(64) Patent No.: Des. 671,940
Issued: Dec. 4, 2012
Appl. No.: 29/406,260
Filed: Nov. 11, 2011

(30) Foreign Application Priority Data

Jul. 29, 2011 (KR) ..... 30-2011-0031692

(51) LOC (10) Cl. ..... 14-02
(52) U.S. Cl.
USPC ..... D14/374
(58) Field of Classification Search
USPC ..... D14/371–376, 125–130, 336, 337, 341, D14/217, 142, 239, 240, 434, 238.1; D6/308, 311; 361/679.08, 679.23; 349/1, 349/2, 11, 58; 345/104, 156, 173, 174; 341/12; 248/917–924, 371
(Continued)

(56) References Cited

U.S. PATENT DOCUMENTS

D490,420 S * 5/2004 Solomon et al. ..... D14/341
D504,889 S * 5/2005 Andre et al. ..... D14/341
(Continued)

*Primary Examiner* — Darlington Ly

(74) *Attorney, Agent, or Firm* — NSIP Law

(57) CLAIM

[The] *I claim the* ornamental design for a mobile phone monitor, as shown and described.

DESCRIPTION

*Notice: more than one reissue application has been filed for the reissue of U.S. Pat. No. D671,940. This design patent application is a reissue of U.S. Design Pat. No. D671,940, issued Dec. 4, 2012, which claims the benefit under U.S.C. Sections 119 and 172 of Korean Patent Application Serial No. 30-2011-0031692, filed Jul. 29, 2011, which is hereby incorporated by reference in its entirety into this application.*

FIG. 1 is a *front* perspective view of a mobile phone monitor *showing my new design*;
FIG. 2 is a front view [of the mobile phone monitor of FIG. 1] *thereof*;
FIG. 3 is a rear view [of the mobile phone monitor of FIG. 1] *thereof*;
FIG. 4 is a left-side view [of the mobile phone monitor of FIG. 1] *thereof*;
FIG. 5 is a right-side view [of the mobile phone monitor of FIG. 1] *thereof*;
FIG. 6 is a top [plan ] view [of the mobile phone monitor of FIG. 1] *thereof*;
FIG. 7 is a bottom [plan ] view [of the mobile phone monitor of FIG. 1] *thereof*; and,
FIG. 8 is a rear perspective view of the mobile phone monitor of FIG. 1, in which a mobile phone [shown] in broken lines [for environmental purposes only and forms no part of the claimed design illustrates] *is provided to illustrate* an example of how the mobile phone may be [docketed in] *docked to* the mobile phone monitor of FIG. 1.
*The broken lines in the figures show portions of the mobile phone monitor which form no part of the claimed design. The broken line showing of the mobile phone in FIG. 8 is for environmental purposes only and forms no part of the claimed design.*

1 Claim, 6 Drawing Sheets

Matter enclosed in heavy brackets [ ] appears in the original patent but forms no part of this reissue; matter printed in italics indicates the additions made by reissue.

AMENDED

(58) Field of Classification Search
CPC ..... F16M 11/08; F16M 11/22; F16M 2200/08
See application file for complete search history.

(56) References Cited

U.S. PATENT DOCUMENTS

| | | | | | |
|---|---|---|---|---|---|
| D617,793 | S | * | 6/2010 | Chiang et al. | D14/341 |
| D629,373 | S | * | 12/2010 | Kim et al. | D14/126 |
| D639,266 | S | * | 6/2011 | DeLorenzo et al. | D14/142 |
| D644,228 | S | * | 8/2011 | Corsini et al. | D14/434 |
| D669,070 | S | * | 10/2012 | Hsu et al. | D14/341 |
| D671,939 | S | * | 12/2012 | Chung | D14/374 |
| D677,181 | S | * | 3/2013 | Lenz et al. | D10/65 |
| 8,605,433 | B2 | * | 12/2013 | Chiang et al. | 361/679.59 |
| 8,606,340 | B2 | * | 12/2013 | Pegg | 455/575.4 |
| D701,570 | S | * | 3/2014 | Fletcher et al. | D19/113 |
| D701,862 | S | * | 4/2014 | Lee et al. | D14/420 |
| D702,231 | S | * | 4/2014 | Park et al. | D14/341 |
| D704,200 | S | * | 5/2014 | Rayner | D14/447 |
| D722,049 | S | * | 2/2015 | Moradian | D14/341 |
| 2003/0236102 | A1 | * | 12/2003 | Kawai et al. | 455/550.1 |
| 2006/0236014 | A1 | * | 10/2006 | Yin et al. | 710/303 |
| 2010/0309617 | A1 | * | 12/2010 | Wang et al. | 361/679.01 |

* cited by examiner

FIG. 1
AMENDED
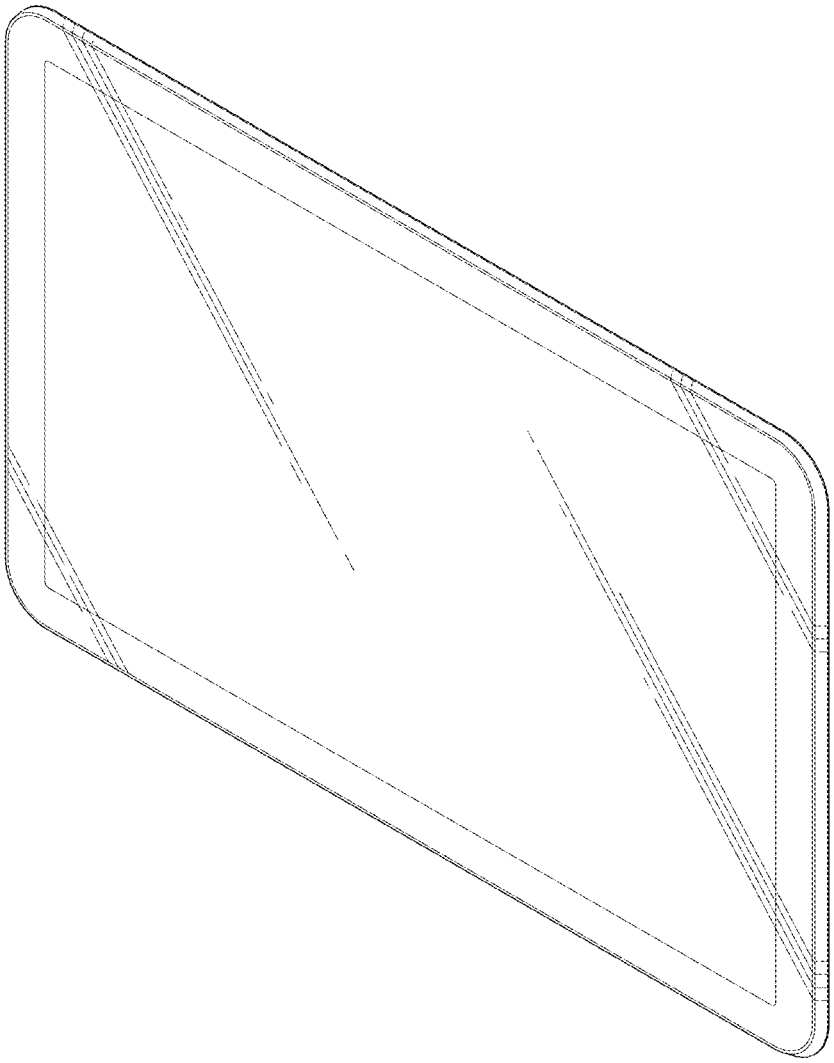

FIG. 2
AMENDED
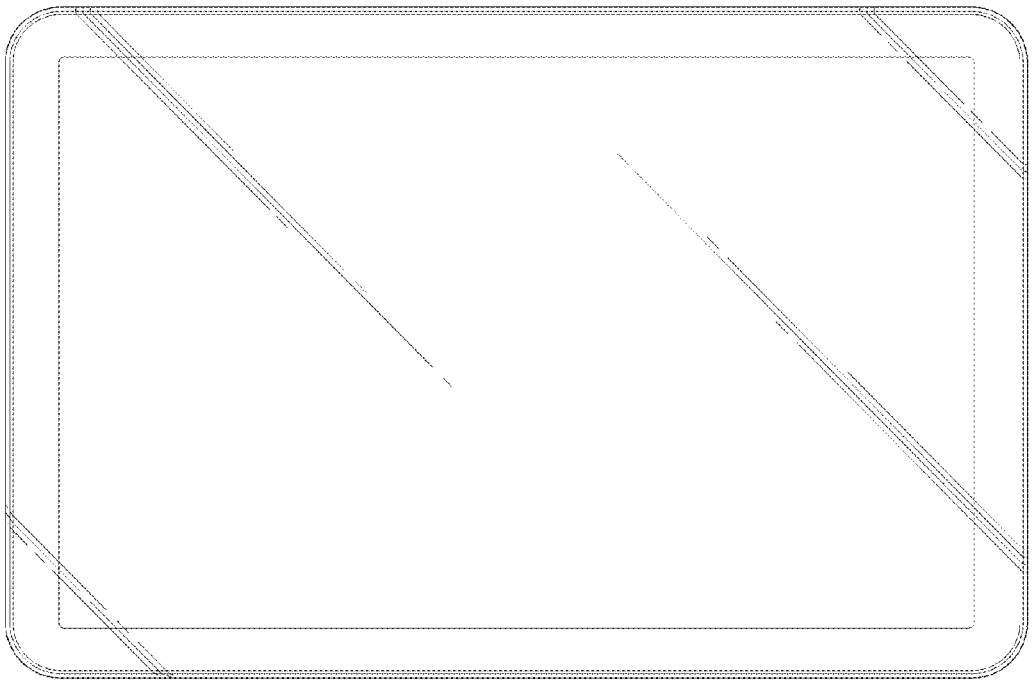

FIG. 3
AMENDED
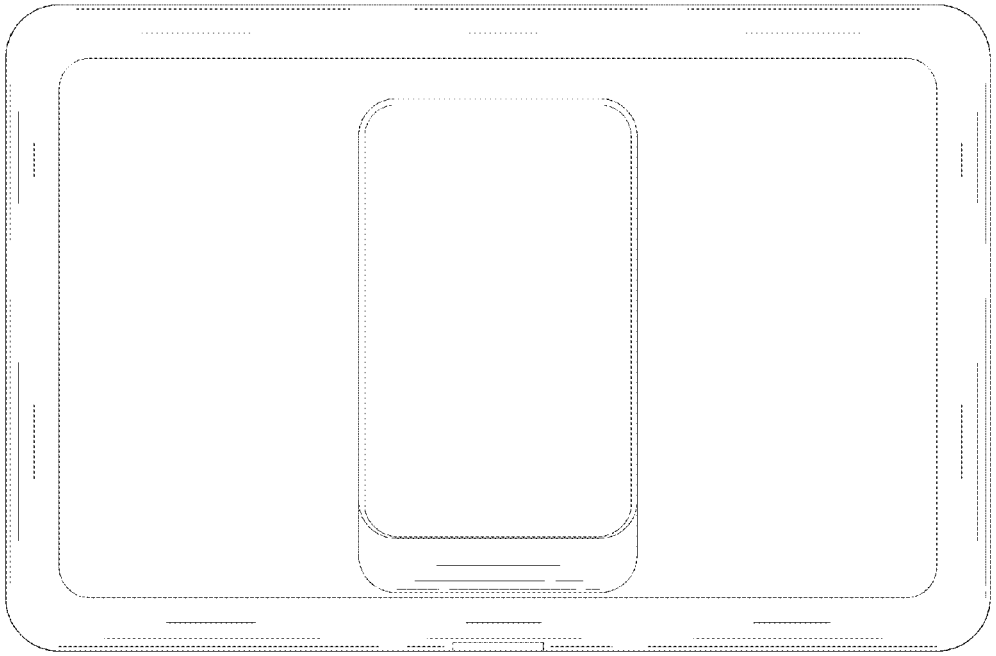

FIG. 4
AMENDED
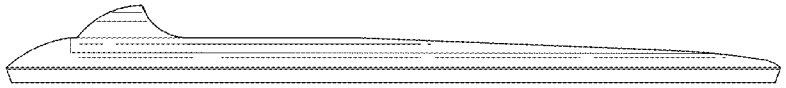
FIG. 5
AMENDED
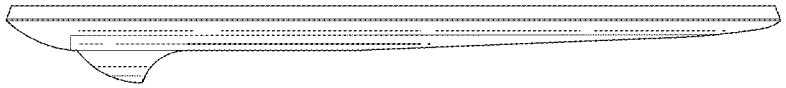

FIG. 6
AMENDED
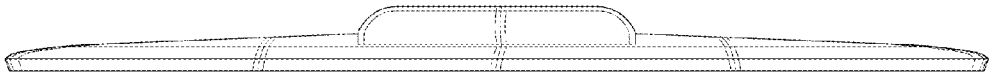
FIG. 7
AMENDED
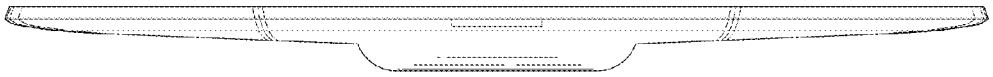

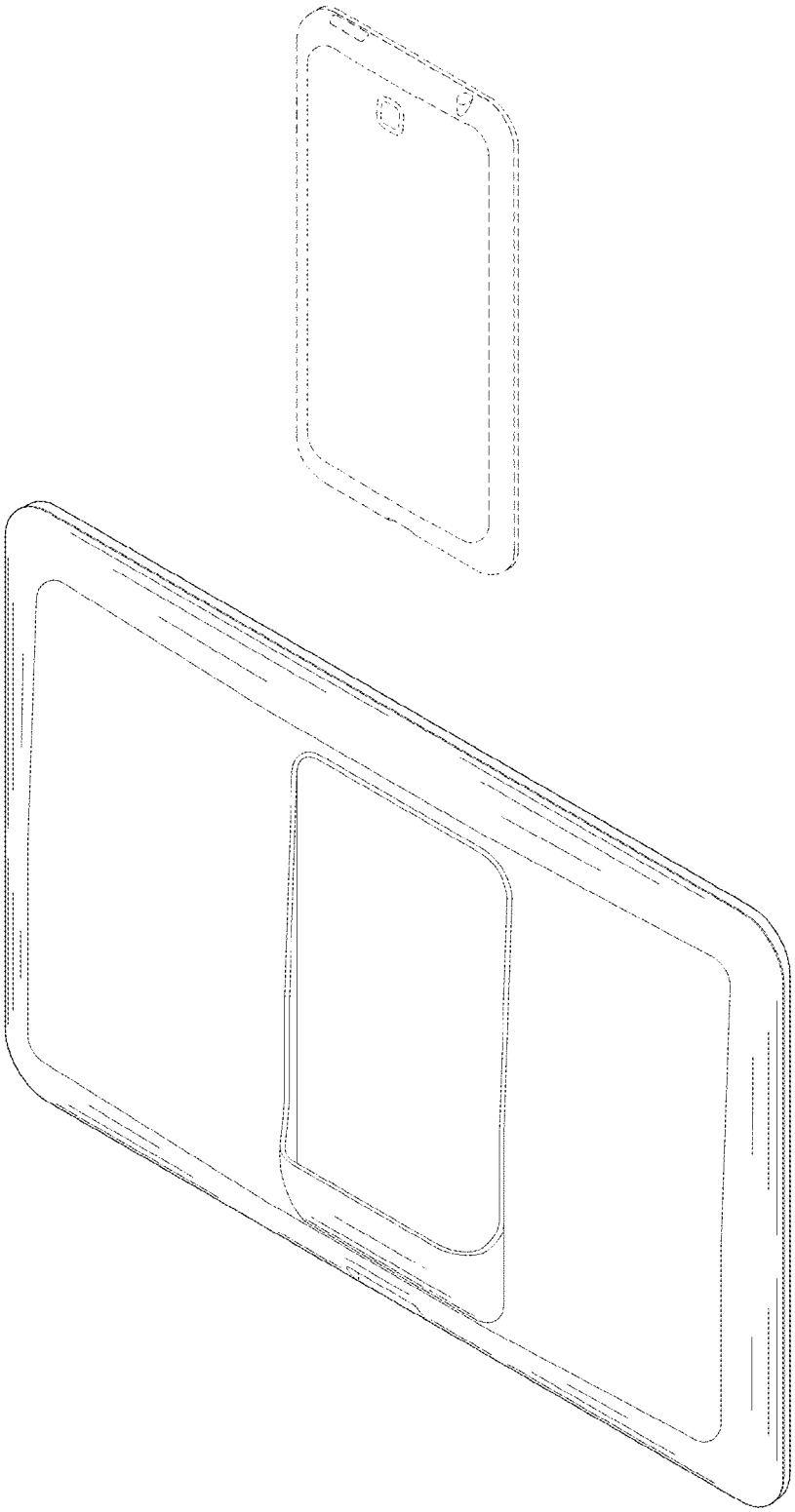

FIG. 8
AMENDED